(12) United States Patent
Chu et al.

(10) Patent No.: US 7,249,241 B1
(45) Date of Patent: Jul. 24, 2007

(54) METHOD AND APPARATUS FOR DIRECT VIRTUAL MEMORY ADDRESS CACHING

(75) Inventors: Hsiao-keng Jerry Chu, Palo Alto, CA (US); Zhongren Xu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 443 days.

(21) Appl. No.: 10/834,410

(22) Filed: Apr. 29, 2004

(51) Int. Cl.
*G06F 12/00* (2006.01)

(52) U.S. Cl. .......................... 711/202; 711/6; 711/203; 711/205; 711/206; 710/22

(58) Field of Classification Search .................... None
See application file for complete search history.

(56) References Cited

U.S. PATENT DOCUMENTS 6,804,729 B2* 10/2004 Swanberg .................... 710/22

7,069,389 B2* 6/2006 Cohen ........................ 711/135
2004/0064669 A1* 4/2004 Browning et al. .......... 711/202
2004/0123068 A1* 6/2004 Hashimoto .................. 711/206

* cited by examiner

*Primary Examiner*—Reginald Bragdon
*Assistant Examiner*—Horace L. Flournoy
(74) *Attorney, Agent, or Firm*—Osha Liang LLP

(57) ABSTRACT

A system including a direct virtual memory access engine configured to request that data is stored in a memory, wherein a request for the data includes a I/O virtual address, a mapping table configured to store at least one entry includes a virtual-to-physical address mapping, a cache configured to store at least one tracking data structure associated with the at least one entry, and an input/output memory management unit storing the mapping table, operatively connected to the cache and configured to provide a physical address corresponding to the I/O virtual address to the direct virtual memory access engine, wherein the virtual-to-physical address mapping is generated prior to the direct virtual memory access engine requesting that data be stored, wherein the at least one entry and the at least one tracking structure persist for at least two direct memory address requests.

18 Claims, 4 Drawing Sheets

METHOD AND APPARATUS FOR DIRECT VIRTUAL MEMORY ADDRESS CACHING

BACKGROUND

In a computer system, virtual memory management automates the movement of instructions and data between physical memory and secondary storage giving the appearance of a single, large memory. Conceptually, the address space of a processor is divided into virtual memory pages of a uniform size, and the physical memory is divided into physical memory pages of the same size. The operating system (OS) and the memory management hardware (i.e., memory management unit (MMU)) of the processor map virtual memory pages into and out of the physical memory pages as applications are executed on the processor. The OS and MMU translate system virtual addresses from the processor into physical memory addresses behind the scenes, creating the illusion of a single-level store with faster access time of random-access memory rather than that of secondary storage.

The concept of the MMU (i.e., to translate system virtual addresses to physical memory addresses) has been extended to work with remote devices and peripheral devices connected to the computer system via an Input/Output (I/O) bus. One such extension is an I/O MMU that performs the same functions as the MMU, but rather than receiving system virtual addresses from the processor, the I/O MMU receives I/O virtual addresses from peripheral devices (or remote devices) via a direct virtual memory access (DVMA) engine. DVMA engines are used to support direct memory access (DMA), which is widely used to move data between the computer system's physical memory and I/O devices. A DMA write request allows the copying of data directly into the computer system's physical memory. Further, a DMA read request allows the reading of data directly from the computer system's physical memory.

As noted above, the I/O MMU enables remote devices and peripheral devices to access the computer system's physical memory by translating the I/O virtual addresses provided by the DVMA engine (i.e., read and write requests) into physical addresses. The physical address may then be used to access the computer system's physical memory and perform the request. More specifically, when a peripheral device (or remote device) requests to access a particular portion of the computer system's physical memory, a request is made to the operating system (or a subsystem therein) to setup a virtual-to-physical address mapping and associated data structures (i.e., data structures required to process the DMA request). The virtual-to-physical mapping is then used to populate an entry in a mapping table located in the I/O MMU. Once the mapping and associated data structures have been setup and the mapping table populated, control is transferred to the DVMA engine. The DVMA engine proceeds to obtain an I/O virtual address from the peripheral device (or remote device) and places the I/O virtual address on the computer system's I/O bus. The I/O MMU, which monitors the I/O bus, obtains the I/O virtual address and proceeds to look up the corresponding physical address in the mapping table.

The I/O MMU subsequently places the corresponding physical address on the I/O bus. The DVMA engine retrieves the physical address and proceeds to read or write data to/from the physical memory using the physical address. Once the DVMA engine has completed the transfer/retrieval of data, the operating system (or a subsystem therein) proceeds to deconstruct the associated data structures and removes the virtual-to-physical mapping entry from the mapping table in the I/O MMU. This process is subsequently repeated for each DMA request.

SUMMARY

In general, in one aspect, the invention relates to a system comprising a direct virtual memory access engine configured to request that data is stored in a memory, wherein a request for the data comprises a I/O virtual address, a mapping table configured to store at least one entry comprising a virtual-to-physical address mapping, a cache configured to store at least one tracking data structure associated with the at least one entry, and an input/output memory management unit storing the mapping table operatively connected to the cache and configured to provide a physical address corresponding to the I/O virtual address to the direct virtual memory access engine, wherein the virtual-to-physical address mapping is generated prior to the direct virtual memory access engine requesting that data be stored, wherein the at least one entry and the at least one tracking structure persist for at least two direct memory address requests.

In general, in one aspect, the invention relates to a method for direct memory access, comprising receiving a request for direct memory access comprising a I/O virtual address, querying a mapping table to obtain a virtual-to-physical address mapping, obtaining the physical address using the virtual-to-physical address mapping, forwarding the physical address to a direct virtual memory access engine, and transferring data to physical memory located at the physical address, wherein, prior to receiving the request for direct memory access pre-allocating the physical memory and a virtual memory, generating the virtual-to-physical address mapping to associate the physical memory to the virtual memory, populating at least one entry in the mapping table with the virtual-to-physical address mapping, and generating at least one tracking structure associated with the at least one entry, and wherein the at least one entry and the at least one tracking structure persist for at least two direct memory address requests.

In general, in one aspect, the invention relates to a computer system for performing for direct memory access, comprising a processor, a memory, a storage device, and software instructions stored in the memory for enabling the computer system under control of the processor to receive a request for direct memory access comprising a I/O virtual address, query a mapping table to obtain a physical address to I/O virtual address mapping, obtain the physical address using the virtual-to-physical address mapping, forward the physical address to a direct virtual memory access engine, and transfer data to physical memory located at the physical address, wherein, prior to the software instructions to receive the request for direct virtual memory access, the computer system executes software instructions to pre-allocate the physical memory and a virtual memory, generate the virtual-to-physical address mapping to associate the physical memory to the virtual memory, populate at least one entry in the mapping table with the virtual-to-physical address mapping, and generate at least one tracking structure associated with the at least one entry, wherein the at least one entry and the at least one tracking structure persists for at least two direct memory address requests.

Other aspects of the invention will be apparent from the following description and the appended claims.

DETAILED DESCRIPTION

Figure 1:
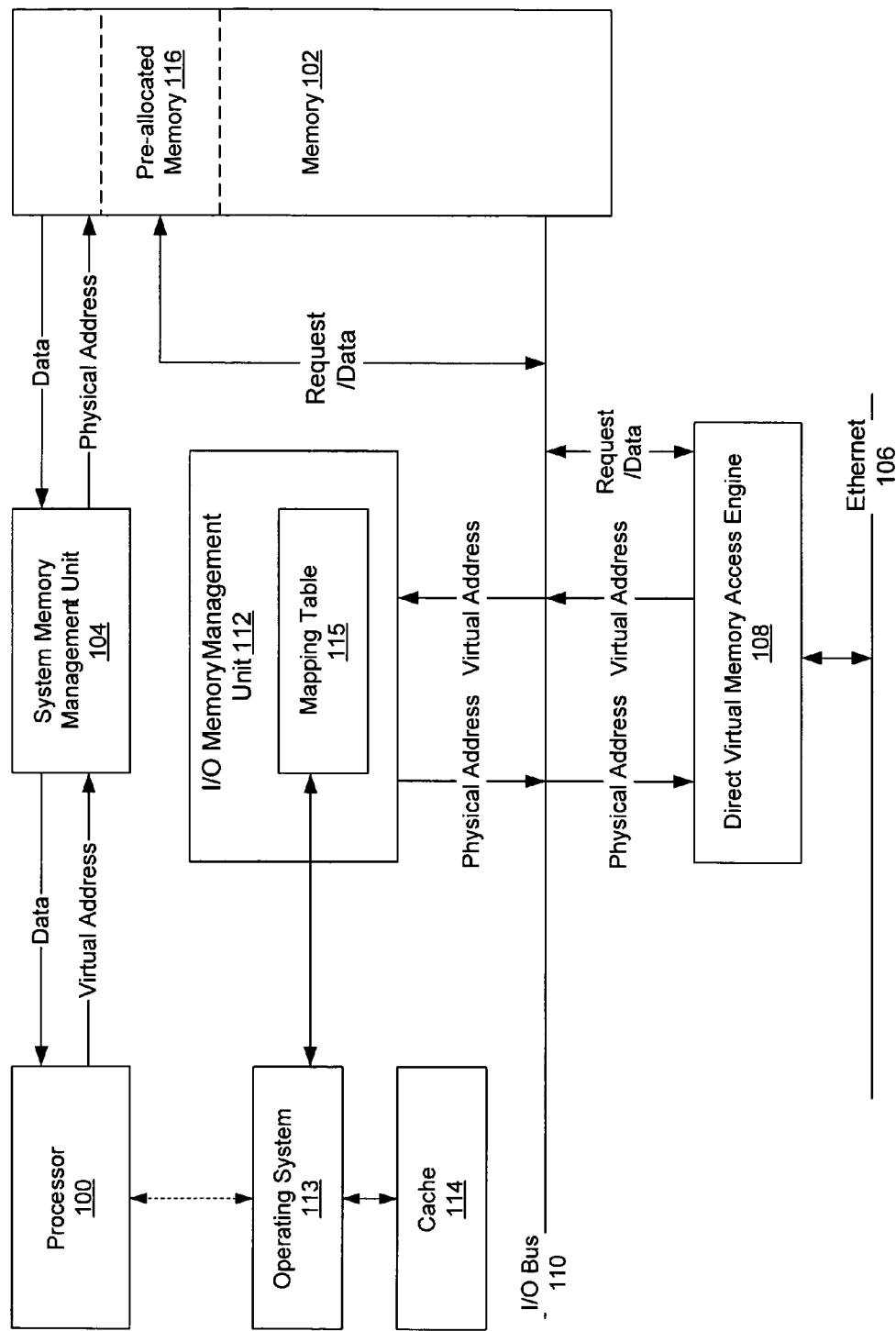
FIG. 1 shows a flow diagram in accordance with one embodiment of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, one or more embodiments of the invention relate to a method and apparatus for direct memory access. More specifically, one or more embodiments of the invention relate to a method and apparatus for caching the virtual-to-physical mappings prior to servicing DMA requests, thereby decreasing the overhead associated with the generation of a virtual-to-physical address mapping (and associated data structures) for each individual DMA request at the time the DMA request is received.

FIG. 1 shows a flow diagram showing the basic components involved in direct memory access, in accordance with one embodiment of the invention. The computer system includes a processor (100) that includes functionality to access the memory (102) by providing a system memory management unit (MMU) (104) with an I/O virtual address. The system MMU (104) includes functionality to translate the I/O virtual address into a physical address, which may then be used to access the memory (102). The memory (102), and more specifically, a memory controller (not shown), obtains the physical address and subsequently performs the function (e.g., read from memory (102), write to memory (102), etc.) at the physical address. Depending on the function performed by the memory controller, data may be sent from the memory (102) to the processor (100) via the system MMU (104).

Peripheral and remote devices may also directly access the memory (102). In one embodiment of the invention, the peripheral device (or remote device) (not shown) forwards a request, via an Ethernet connection (106), to the computer system. A DVMA engine (108) receives the request from the Ethernet connection (106). In one embodiment of the invention, the request includes an I/O virtual address. The DVMA engine (108) proceeds to place the I/O virtual address on the I/O bus (110). An I/O MMU (112) subsequently retrieves the I/O virtual address from the I/O bus (110) and proceeds to obtain a corresponding physical address.

In one embodiment of the invention, the I/O MMU (112) obtains a corresponding virtual-to-physical mapping from a mapping table (115) stored in the I/O MMU (112). Using the virtual-to-physical address mapping, the I/O MMU (112) subsequently generates a physical address corresponding to the I/O virtual address obtained from the I/O bus (110). The I/O MMU (112) subsequently places the physical address on the I/O bus (110). The physical address is then used by the DVMA engine (108) to interact with the memory (102), e.g., to transfer data to the memory (102) starting at the physical address, to read data from the memory (102) starting at the physical address, etc.

In one embodiment of the invention, the virtual-to-physical address mappings stored in the mapping table (115) are generated during the time when the computer system first allocates physical memory and maps the memory into the system MMU (104). Thus, in accordance with one embodiment of the invention, the operating system (113) pre-allocates a block of memory (116) within the memory (102), maps the pre-allocated memory (116), and stores the virtual-to-physical address mappings as entries in the mapping table (115). In one embodiment of the invention, the mappings are performed on a per-page basis.

In addition, the operating system (113) (or a subsystem therein) includes functionality to generate the associated data structures that are required by the operating system (113) to service DMA requests. For example, the operating system (113) (or a subsystem therein) may create data structures to track which portions of the pre-allocated memory are empty (or partially empty) and which portions are full. One or more of the aforementioned data structures may be maintained in a cache (114). In one embodiment of the invention, the cache (114) corresponds to virtual memory associated with the operating system (113). In addition, the operating system (113) (or a subsystem therein) may include functionality to free one or more pre-allocated portions of memory.

In one embodiment of the invention, once a DMA request has been completed (i.e., data has been read from the pre-allocated memory (116) or written to the pre-allocated memory (116)), the virtual-to-physical address mappings stored in the mapping table (115), as well as the associated data structures stored in the cache (114), are not deconstructed. Rather, the virtual-to-physical address mappings and associated data structures remain in the computer system. Depending on the implementations of the present invention, a tracking data structure that tracks the allocation and usage of the pre-allocated memory (116) may be updated to reflect the results of processing the DMA request (e.g., the tracking data structure may reflect that a given portion of physical memory (116) has been allocated, etc.).

Those skilled in the art will appreciate that the operating system (113) (or an associated subsystem therein) may be modified to include the necessary data structures and functionality to support the aforementioned functions. Those skilled in the art will further appreciate that while the invention is described above using a contiguous portion of memory to represent pre-allocated memory (116), the pre-allocated memory (116) may be distributed across the memory (102) in a non-contiguous manner.

Figure 2:
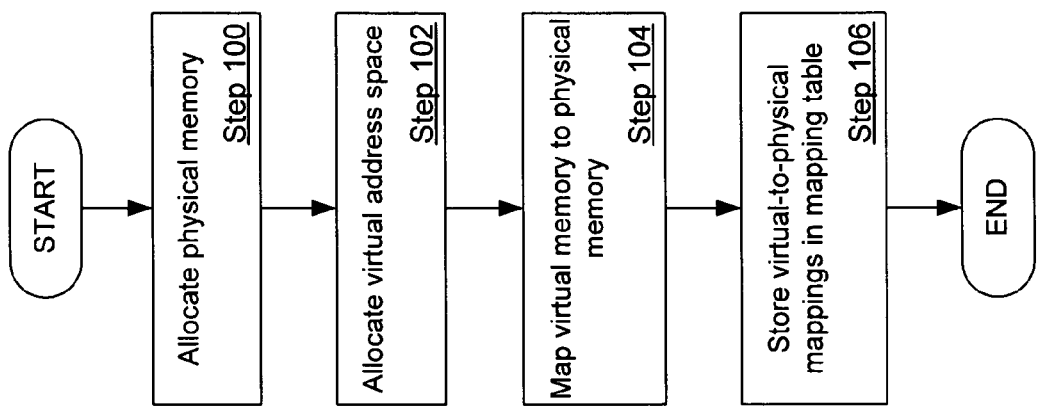
FIG. 2 shows a flowchart for initializing a mapping cache in accordance with one embodiment of the invention.

FIG. 2 shows a flowchart for initializing a mapping cache in accordance with one embodiment of the invention. Initially, the operating system allocates a portion of physical memory (e.g., pre-allocated memory (116) in FIG. 1) (Step 100). The operating system subsequently allocates a corresponding portion of virtual memory (i.e., an I/O virtual address space) (Step 102). The virtual memory is subsequently mapped to the physical memory to generate virtual-to-physical address mappings (Step 104). The virtual-to-physical mappings are subsequently stored as entries in a mapping table (e.g., a mapping table (115) in FIG. 1) in the I/O MMU (Step 106). In one embodiment of the invention, the mapping table is populated with virtual-to-physical address mappings when the computer system is booted and physical memory is initially allocated.

In addition, though not shown in FIG. 2, when the virtual-to-physical address mappings are generated, the associated data structures enabling I/O data transfers via DMA are also generated and initialized. Thus, for example, if the implementation of the invention requires that the operating system (or a subsystem therein) track how the pre-allocated memory is allocated, then the associated data structure (e.g., a tracking data structure for tracking allocation of the pre-allocated memory) is initialized at this stage. In one embodiment of the invention, the associated data structures are stored in the cache. Those skilled in the art will appreciate that prior to implementing the aforementioned steps, the I/O MMU, corresponding device drivers required for DMA, etc., may be modified as necessary to indicate the presence of the cache, associated data structures, etc.

Figure 3:
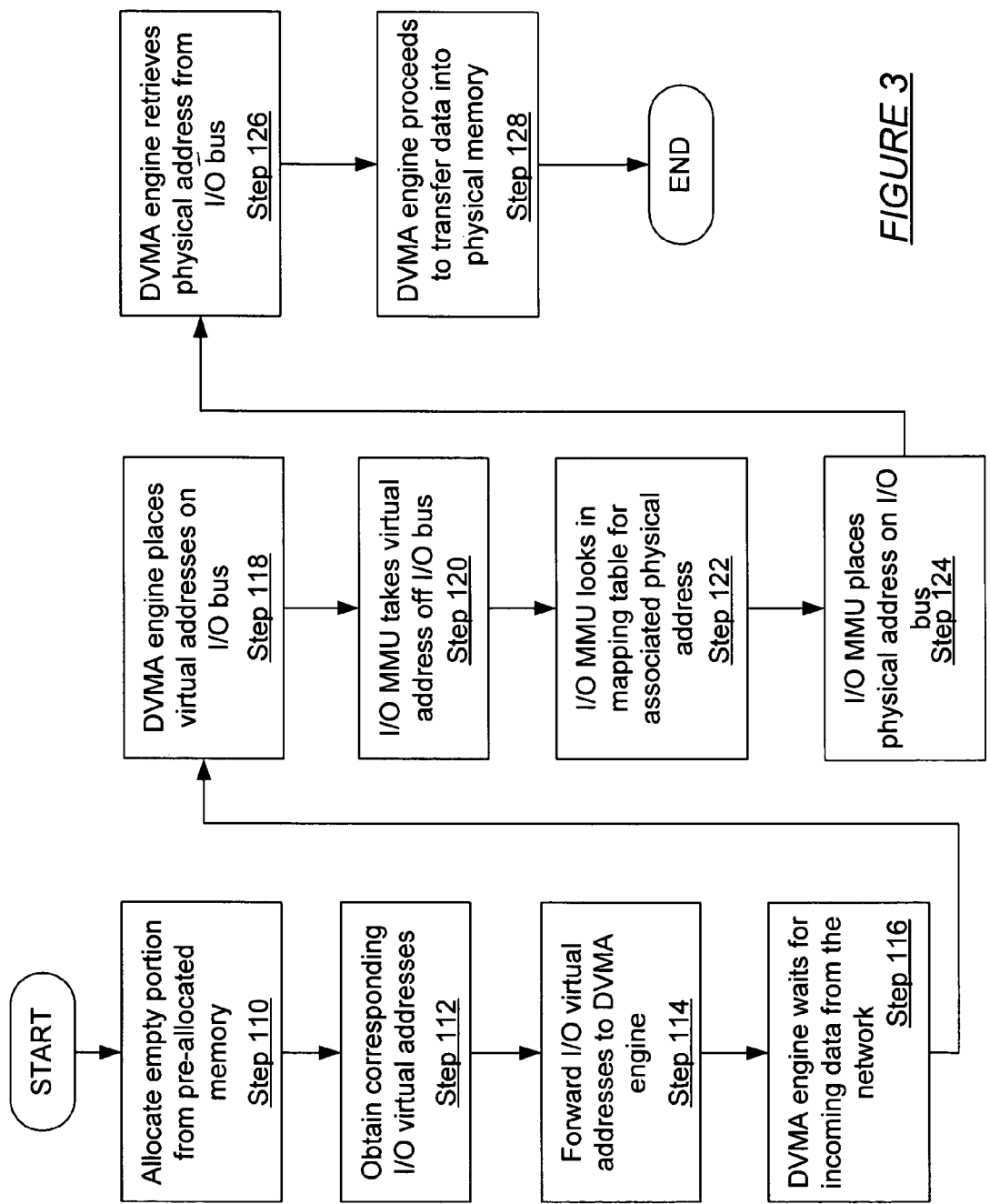
FIG. 3 shows a flowchart for using a mapping cache in accordance with one embodiment of the invention.

At this stage, the computer system, including both the operating system (and/or subsystems therein) are now ready to service DMA requests in accordance with one or more embodiments of the invention. FIG. 3 shows a flowchart for servicing a DMA request in accordance with one embodiment of the invention. Initially, the host computer (i.e., the computer receiving the data from the network) allocates empty portions of physical memory from the pre-allocated physical memory (Step 110). Software executing on the host computer (i.e., the computer that received the data from the network) then queries the tracking data structures residing in the cache to determine the I/O virtual addresses that correspond to the allocated physical memory (Step 112). The host computer then forwards the I/O virtual addresses obtained from the tracking data structure to the DVMA engine (Step 114). At this stage, the DVMA engine is said to be "programmed" (i.e., ready to receive data from the network and store it in the allocated physical memory).

The DVMA engine subsequently waits for data to be received from the network (Step 116). Once data has been received, the DVMA engine processes the received data. Specifically, the DVMA engine places a corresponding I/O virtual address on the I/O bus (Step 118). The I/O MMU subsequently retrieves the I/O virtual address from the I/O bus (Step 120). The I/O MMU then queries the mapping table for the physical address corresponding to the I/O virtual address (Step 122). Upon finding the corresponding entry in the mapping table, the I/O MMU retrieves the physical address. The physical address is subsequently placed on the I/O bus by the I/O MMU (Step 124).

The DVMA engine subsequently retrieves the physical address from the I/O bus (Step 126). The DVMA engine then proceeds to transfer the data into the pre-allocated memory starting at the physical address (Step 128). Those skilled in the art will appreciate that Steps 118–128 are performed whenever data is received from the network.

Though not shown in FIG. 3, once the data received from the network or data sent over the network has been processed, the virtual-to-physical mapping and associated data structures used to service the DMA request are not deconstructed but rather de-allocated in accordance with one embodiment of the invention. Thus, in one embodiment of the invention, the same virtual-to-physical mapping and associated data structures may be used again at a later time without requiring a new virtual-to-physical mapping and associated data structures to be re-constructed.

Those skilled in the art will appreciate that when the DVMA engine receives a command to write data into the pre-allocated memory, the device drivers associated with the computer system are aware that the mapping cache handles the data accordingly. Those skilled in the art will further appreciate that when the DVMA engine receives a command (usually from the processor) to transfer data to a remote device, the various layers within the operating system stack (e.g., the socket layer) may need to be modified to perform one or more embodiments of the invention.

In one embodiment of the invention, the invention may be implemented such that the I/O MMU initially queries the mapping table to determine whether a corresponding virtual-to-physical address mapping exists. However, if no virtual-to-physical mapping exists, then the I/O MMU may proceed to transfer control back to the operating system. The operating system may then proceed to generate a new virtual-to-physical mapping and associated data structures. The new virtual-to-physical page mapping and associated data structures may then be used to provide the DVMA engine with a physical address, which may be subsequently used to perform the read/write data from/to memory.

Those skilled in the art will appreciate that the invention may also be applied to the situation in which the host computer is transmitting data to the network. In one embodiment of the invention, the steps for transmitting data to the network, in accordance with the invention, correspond to the steps of receiving data performed in reverse order.

Figure 4:
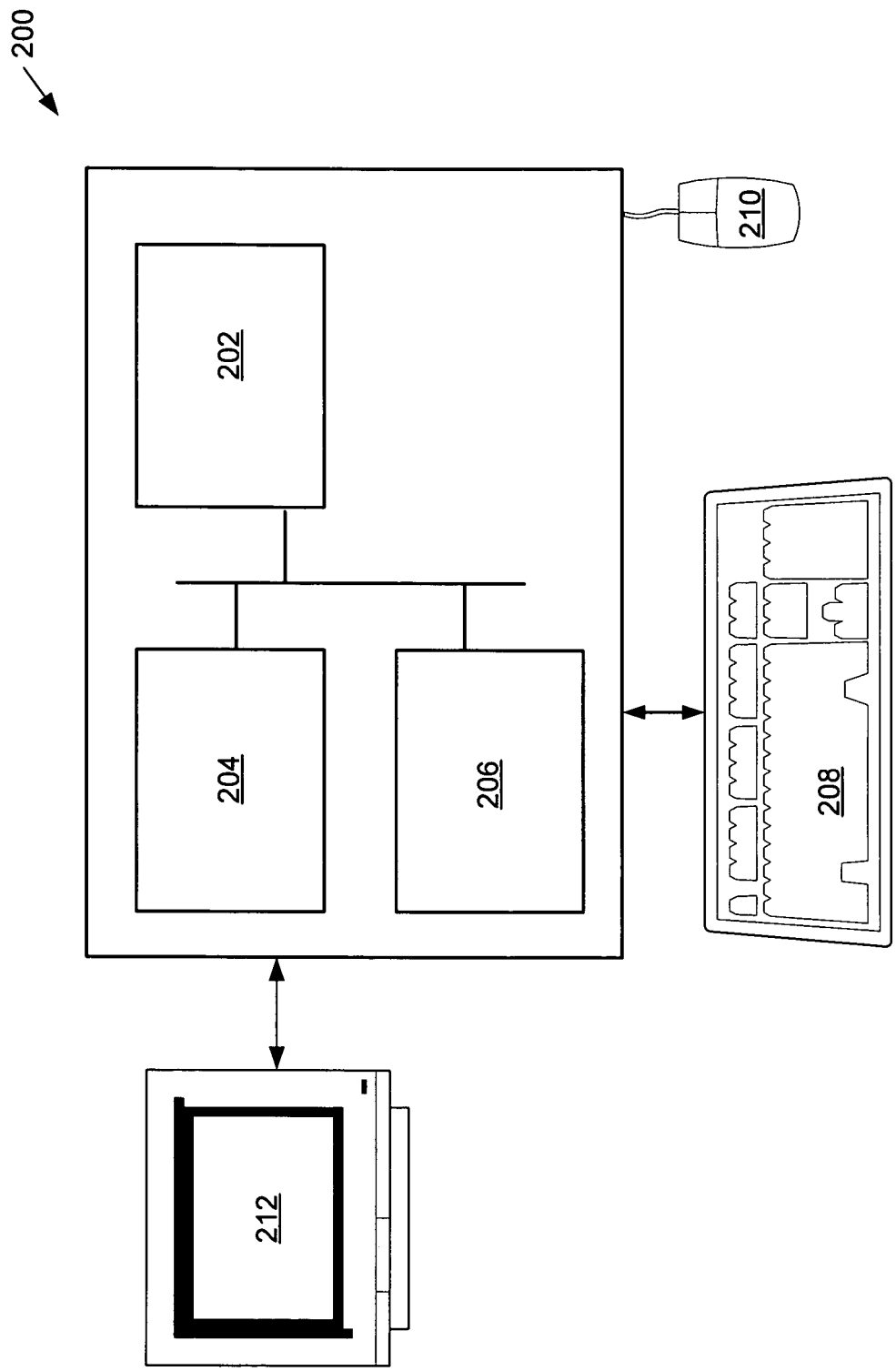
FIG. 4 shows a computer system in accordance with one embodiment of the invention.

The invention may be implemented on virtually any type of computer regardless of the platform being used. For example, as shown in FIG. 4, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (200) may be located at a remote location and connected to the other elements over a network.

One or more embodiments of the invention may provide a means to more efficiently use DMA. Further, one or more embodiments of the invention may provide a means to reduce the latency and overhead associated with using DMA and I/O virtual addresses.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a direct memory access engine configured to request that data is stored in a memory, wherein a request for the data comprises an I/O virtual address;
   a mapping table configured to store at least one entry comprising a virtual-to-physical address mapping;
   a cache configured to store at least one tracking data structure associated with the at least one entry; and
   an input/output memory management unit storing the mapping table, operatively connected to the cache and configured to provide a physical address corresponding to the I/O virtual address to the direct virtual memory access engine, wherein the virtual-to-physical address mapping is generated prior to the direct virtual memory access engine requesting that data be stored,
wherein the at least one entry and the at least one tracking structure persist for at least two direct memory access requests.

2. The system of claim 1, wherein the memory is pre-allocated and associated with the at least one entry.

3. The system of claim 2, wherein an operating system executing on the system is configured to track allocation of the pre-allocated memory.

4. The system of claim 1, wherein a portion of the memory is pre-allocated to store data.

5. The system of claim 1, wherein an operating system executing on the system is configured to track the allocation of the virtual-to-physical address mapping.

6. The system of claim 5, wherein the allocation of the virtual-to-physical address mapping is tracked using a tracking structure.

7. A method for direct memory access, comprising:
receiving a request for direct memory access comprising an I/O virtual address;
querying a mapping table to obtain a virtual-to-physical address mapping;
obtaining a physical address using the virtual-to-physical address mapping;
forwarding the physical address to a direct virtual memory access engine; and
transferring data to physical memory located at the physical address,
wherein, prior to receiving the request for direct memory access:
pre-allocating the physical memory and a virtual memory,
generating the virtual-to-physical address mapping to associate the physical memory to the virtual memory,
populating at least one entry in the mapping table with the virtual-to-physical address mapping, and
generating at least one tracking structure associated with the at least one entry, and
wherein the at least one entry and the at least one tracking structure persist for at least two direct memory access requests.

8. The method of claim 7, further comprising:
updating the at least one tracking structure once the data is stored in physical memory.

9. The method of claim 8, wherein the at least one tracking structure is stored in a cache.

10. The method of claim 9, wherein an operating system managing the cache is configured to track the allocation of the memory using the at least one tracking structure.

11. The method of claim 7, further comprising:
allocating the physical address once the physical address has been obtained.

12. The method of claim 7, further comprising:
freeing the memory once the request has been completed.

13. A computer system for performing direct memory access, comprising:
a processor;
a memory;
a storage device; and
software instructions stored in the memory for enabling the computer system under control of the processor to:
receive a request for direct memory access comprising an I/O virtual address;
query a mapping table to obtain a physical address to I/O virtual address mapping;
obtain the physical address using the virtual-to-physical address mapping;
forward the physical address to a direct virtual memory access engine; and
transfer data to physical memory located at the physical address,
wherein, prior to the software instructions to receive the request for direct memory access, the computer system executes software instructions to:
pre-allocate the physical memory and a virtual memory,
generate the virtual-to-physical address mapping to associate the physical memory to the virtual memory,
populate at least one entry in the mapping table with the virtual-to-physical address mapping, and
generate at least one tracking structure associated with the at least one entry,
wherein the at least one entry and the at least one tracking structure persists for at least two direct memory access requests.

14. The system of claim 13, further comprising software instructions to:
update the at least one tracking structure once the data is stored in the physical memory.

15. The system of claim 14, wherein an operating system managing a cache is configured to track the allocation of the physical memory using the at least one tracking structure.

16. The system of claim 13, wherein the at least one tracking structure is stored in the cache.

17. The system of claim 13, further comprising software instructions to:
allocate the physical address once the physical address has been obtained.

18. The system of claim 13, further comprising software instructions to:
free the virtual-to-physical mapping once the request has been completed.

* * * * *